Feb. 14, 1961     C. B. BAKER     2,971,236
DIAPER FASTENING DEVICE
Filed June 4, 1956
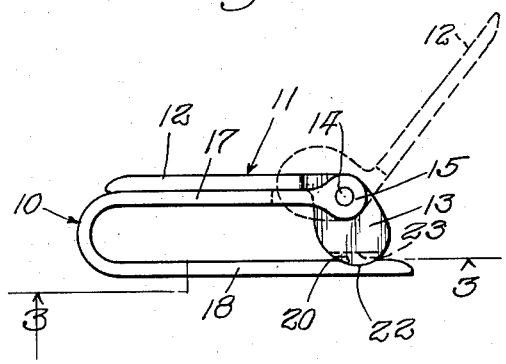
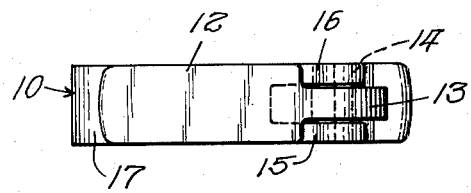
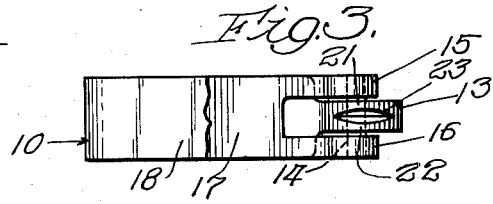
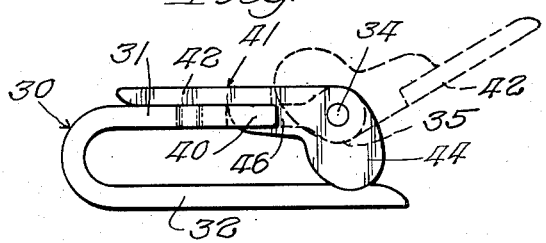
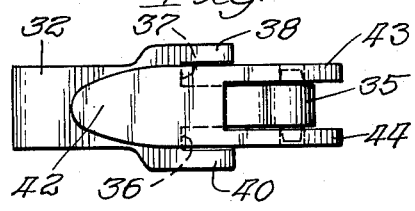
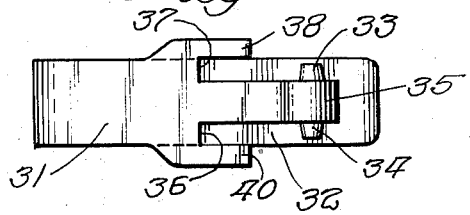
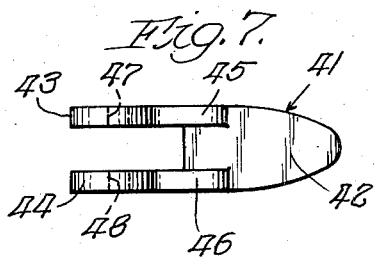
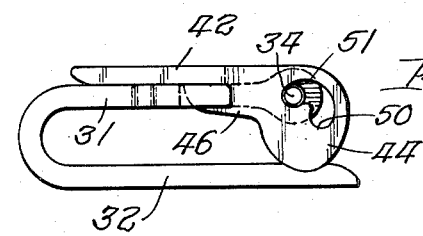
Inventor:
Charles B. Baker.

United States Patent Office 2,971,236
Patented Feb. 14, 1961

2,971,236

DIAPER FASTENING DEVICE

Charles B. Baker, 5642 Hillcrest, Downers Grove, Ill.

Filed June 4, 1956, Ser. No. 589,125

2 Claims. (Cl. 24—248)

This invention relates to a fastening device, and more particularly to a fastening device adapted for use in securing a diaper upon a baby.

Common safety pins have many well known disadvantages when used in securing diapers upon babies. Frequently either the baby of the person putting the diaper on the baby is pricked by the sharp end of the safety pin in attempting to pass the pin through the thickness of the diaper. It is not uncommon for a safety pin to become unclasped while in use resulting in the piercing of the baby's skin by the needlelike point of the safety pin. Other hazards constantly confronting a parent using safety pins around his child are the danger that the child may swallow an unclasped pin, or that an open pin might fall from the hand upon the face of the child.

The present invention obviates all of the above undesirable features present in the common safety pin, and, in addition, provides a fastening device which is more durable, which is more easily fastened in place and which has superior fastening qualities in operation. Accordingly, the primary object of the present invention is to provide a new and improved fastening device which is particularly well adapted for attachment to cloth material.

Another object is to provide a fastening device adapted to grip cloth material at spaced points to prevent twisting of the cloth with respect to the device.

Another object is to provide a fastening device adapted for gripping cloth materials of various thicknesses.

Still another object is to provide a fastening device in which one of the gripping elements is swingably mounted and passes over center in moving to fastening position to assure that the device remains in fastening position.

Yet another object is to provide a fastening device which is well adapted to production in quantity.

A further object is to provide a fastening device of plastic material having a resilient forked gripping member which may be snapped over stud journals to provide a swingable mounting, the fastening device also being provided with cooperating guides and shoulders which retain the gripping member upon its stud journals when the gripping member is swung to fastening position.

The invention is illustrated in a preferred embodiment in the accompanying drawings, in which:

Fig. 1 is a side elevational view of the fastening device in fastening or gripping position, the swingable member in dotted outline illustrating the fastening device in open position;

Fig. 2, a top plan view of Fig. 1;

Fig. 3, a sectional view taken as indicated on line 3—3 of Fig. 1;

Fig. 4, a side elevational view as in Fig. 1 showing a modified form of the invention;

Fig. 5, a top plan view of Fig. 4;

Fig. 6, a top plan view of the U-shaped member in Fig. 4;

Fig. 7, a bottom plan view of the swingable member shown in Fig. 4; and

Fig. 8, a side elevational view of a modified form of the device shown in Fig. 4, the modified form having two pairs of bearing surfaces permitting adjustment of the fastening device to accommodate cloth materials of various thicknesses.

In the embodiment illustrated in Fig. 1, the fastening device comprises a U-shaped member or frame, preferably of resilient material, generally designated 10, and a swingable member, generally designated 11. The swingable member 11 may include a finger lever 12 and a cam head or member 13 which is preferably eccentrically mounted upon a pin 14 journaled in the bifurcated portions 15 and 16 at the free end of an arm 17 of the U-shaped member 10.

The U-shaped member 10 has a second arm 18 which is spaced from the arm 17 a distance depending upon the ultimate desired position of the cam head 13 when the fastening device is in fastening position. As best seen in Fig. 1, it is preferred that the arm 18 has a depressed surface 20 near its free end to cooperate with a pair of gripping surfaces 21 and 22 separated by the notched portion 23 on the cam head 13 (Fig. 3). As can be seen in Fig. 1, it is preferred that the depressed surface 20 be located outwardly toward the open end of the U-shaped member 10 farther than the center of pivot of the cam head 13, and that the cam head 13 be shaped so that when moved to fastening position, as shown in Fig. 1, the cam head 13 passes over center and the gripping surfaces 21 and 22 are in opposed relation to the depressed surface 20.

The fastening device may be made from sheet metal, from plastic or from a combination of the two. It is also contemplated that a transverse raised portion may be formed on the arm 18 in place of the depressed surface 22 to serve as a cooperating gripping element with the surface of the cam head 13; or that a transversely extending series of nodes may be formed in place of the depressed surface 22 to cooperate with the cam head 13.

In operation, the swingable member 12 is initially swung to open position as indicated in dotted outline in Fig. 1. The U-shaped member is then advanced so that a marginal edge portion of the diaper or other cloth material enters the open end of the U-shaped member 10. The swingable member may next be pivoted, counterclockwise as shown in Fig. 1, to fastening position in which the finger member lies adjacent the arm 17 of the U-shaped member 10 and the diaper or cloth material is gripped between the depressed surface 20 of the arm 18 and the cooperating gripping surfaces 21 and 22 of the cam head. It will be noted that any force tending to pull the diaper or cloth material out of the open end of the U-shaped member merely passes the finger lever more tightly against the arm 17 and the fastening device will not become unclasped.

In the embodiment illustrated in Figs. 4, 5, 6 and 7 the U-shaped member generally designated 30 is provided with a pair of arms 31 and 32. This embodiment of the invention is particularly well adapted to be made from plastic material which is more resilient than sheet metal. The arm 31 may be provided with a pair of stud journals 33 and 34 near its narrow outer free end 35. The central portion is preferably slightly enlarged and a pair of slots 36 and 37 are provided to space a pair of longitudinally extending shoulders 38 and 40 from the free end portion 35.

The swingable member generally designated 41 of this embodiment has a finger element 42 and a pair of spaced cam heads 43 and 44 extending outwardly from the finger member 42 and joined thereto by a pair of strengthening guide portions 45 and 46. The cam heads 43 and 44 are spaced transversely of the finger lever 42 so as to be adapted to fit about the free end portion 35 of the U-shaped member 30, and a pair of bearing surfaces 47 and 48 are formed in the cam heads 43 and 44 and are preferably of a size to make a snug fit with each of the stud journals 33 and 34.

In this embodiment it is preferred that the swingable member 41 be made from a plastic material which is sufficiently resilient so that the bearing surfaces 47 and 48 in the cam heads 43 and 44 may be snapped over the stud journals 33 and 34 to secure the swingable member 41 to the U-shaped member 30. This is preferably accomplished by positioning the swingable member as shown in dotted outline in Fig. 4 so that the cam heads 43 and 44 and the guide portions 45 and 46 will not contact the shoulders 38 and 40 of the U-shaped member 30 when the cam heads 43 and 44 are sprung apart to position the stud journals 33 and 34 in the bearing surfaces 47 and 48.

In operation, as in the first embodiment, the fastening device is swung to open position so that the swingable member is located as in dotted outline in Fig. 4. The U-shaped member is then advanced about a marginal edge portion of the diaper or other cloth material, after which the swingable member is rotated counterclockwise, as viewed in Fig. 4, to closed position. As the swingable member 41 is rotated toward closed or fastening position, as the cam heads 43 and 44 begin to grip the surface of the diaper or other cloth material, the guide portions 45 and 46 pass downwardly into the slots 36 and 37 in the central portion of the U-shaped member 30 and the outer sides of the guide portions 45 and 46 bear against the inner side walls of the shoulders 38 and 40 to assure that the cam heads 43 and 44 will not snap out of engagement with their respective stud journals 33 and 34 as the gripping action is completed and the swingable member moves completely into closed or fastening position.

It should be noted that in this second embodiment the cam heads 43 and 44 grip the diaper surface in spaced portions so as to resist the tendency of a diaper to twist with respect to a fastening device. In other respects, the cam heads 43 and 44 cooperate with the arm 32 of the U-shaped member in the manner discussed in relation to the first embodiment. It is, of course, understood that the dual cam heads 43 and 44 may be utilized with a journal pin as in the first embodiment in which case it may not be necessary to provide the shoulders 38 and 40 and the guide portions 45 and 46.

Fig. 8 illustrates a feature which may be readily adapted to either the first or second modification discussed above. In Fig. 8, the cam heads 43 and 44 are preferably provided with two pairs of bearing surfaces 50 and 51, so that by engaging the stud journals 33 and 34 in one or the other of the pairs of bearing surfaces the fastening device may be used with diapers of varying thicknesses. For example, if a double thickness of diaper is desired to be used the stud journals 33 and 34 may be engaged in the pair of bearing surfaces 50 so as to space the head an additional distance from the arm 32 when in closed or fastening position. If it is desired to utilize it with a single diaper the stud journals may be engaged in the pair of bearing surfaces 51 which permits the cam heads to cooperate with the free end of the arm 32 to grip a single thickness of diaper.

If desired the swingable member 41 or other portions of the fastening device may be appropriately decorated with animal figures or other configurations suitable for devices to be used in the baby field. It is also contemplated by the invention that the face of an arm of the U-shaped member 30 which lies adjacent a baby's skin when fastened to a diaper may have adhered to it felt or other cloth material so that the baby's skin will not be immediately adjacent the metal or plastic of the fastening device.

The foregoing detailed description is given for clearness of understanding only and no unnecessary limitations should be understood therefrom, for some modifications will be obvious to those skilled in the art.

I claim:

1. A fastening device for gripping a baby diaper, comprising: a U-shaped frame of resilient material having a pair of opposed arms, the free end of one of the arms having a pair of laterally extending stud journals, said one arm having a pair of slots extending rearwardly from the open end of the frame to form a pair of laterally spaced shoulders on opposite sides of the arm; and a swingable member of resilient, plastic material having a finger lever at one end and a pair of elements forming a forked portion at the other end, each of said elements including a cam head having an aperture adapted to be snapped upon and make a snug fit with one of the stud journals and a narrow guide portion extending between the cam head and the finger lever in alignment with one of the slots, said cam heads being swingable together between an open position and a closed position in which a diaper inserted between the opposed arms is gripped in spaced portions between a surface of each of the cam heads and the other of said arms, each of said guide portions being swingable with its respective cam head so as to enter into an aligned slot and bear against an adjacent shoulder so that each of the cam heads will be retained upon its respective stud journal as the cam heads grip the diaper in moving to closed position.

2. A fastening device for gripping a baby diaper, comprising: a U-shaped frame having a pair of opposed arm members, the free end of one of the arm members being provided with spaced journal elements; spaced cam members supported on said journal elements for swingable movement between an open position and a fastening position in which the diaper is frictionally gripped between a surface of each of the cam members and the other of said arm members, each of said cam members being provided with corresponding upper and lower bearing surfaces so that the spaced journal elements can be selectively engaged in a corresponding pair of said bearing surfaces to vary the distance between the cam engaging surfaces and the other arm members when the cam members are in fastening position; and a finger lever secured to the cam members for swinging said cam members between open and fastening positions, said finger lever lying adjacent said one arm member when the cam members are in fastening position.

References Cited in the file of this patent

UNITED STATES PATENTS

| | | |
|---|---|---|
| 327,282 | Levett | Sept. 29, 1885 |
| 435,887 | Ellithrop | Sept. 2, 1890 |
| 706,522 | Bryant | Aug. 12, 1902 |
| 745,990 | Baker | Dec. 8, 1903 |
| 764,238 | Hamilton | July 5, 1904 |
| 2,238,386 | Frank | Apr. 15, 1941 |
| 2,398,962 | Randrup | Apr. 23, 1946 |
| 2,433,906 | Husted | Jan. 6, 1948 |